(12) United States Patent
Brennan, Jr.

(10) Patent No.: US 6,698,607 B2
(45) Date of Patent: *Mar. 2, 2004

(54) SHIPPING PLATFORM LOCKDOWN

(76) Inventor: James Brennan, Jr., 876 Land St., East Riverton, NJ (US) 08077-1827

( * ) Notice: Subject to any disclaimer, the term of this patent is extended or adjusted under 35 U.S.C. 154(b) by 0 days.

This patent is subject to a terminal disclaimer.

(21) Appl. No.: 10/010,253

(22) Filed: Nov. 9, 2001

(65) Prior Publication Data

US 2002/0047010 A1 Apr. 25, 2002

Related U.S. Application Data

(63) Continuation-in-part of application No. 09/277,105, filed on Mar. 21, 1999, now Pat. No. 6,315,141.

(51) Int. Cl.⁷ ........................ B65D 25/20; B65D 88/12
(52) U.S. Cl. ........................ 220/1.5; 220/481; 410/80
(58) Field of Search ................... 220/1.5, 481, 629, 220/636, 638, 729; 410/80, 85, 90, 77, 78; 224/404, 539, 544; 206/386

(56) References Cited

U.S. PATENT DOCUMENTS

| 3,125,035 A | 3/1964 | Loomis |
| 4,236,853 A | 12/1980 | Niggemeier et al. |
| 4,382,734 A | 5/1983 | Synowiec et al. |
| 4,682,923 A | 7/1987 | Gerhard |
| 5,000,635 A | 3/1991 | Jensen et al. |
| 6,315,141 B1 * | 11/2001 | Brennan, Jr. ................. 220/1.5 |

* cited by examiner

*Primary Examiner*—Nathan J. Newhouse
*Assistant Examiner*—Niki M. Eloshway
(74) *Attorney, Agent, or Firm*—Norman E. Lehrer

(57) ABSTRACT

A shipping box or platform having a bottom with rails extending outwardly from the sides thereof adjacent the bottom is locked down onto the floor of an aircraft by a pair of spaced apart elongated locking members mounted on the floor. The distance between the locking members limits the width of the bottom of the shipping box or platform. In order to increase the size of the box or platform, the side walls extend outwardly beyond the width of the bottom. The lockdown rails are thus recessed beneath the side walls of the box or platform.

3 Claims, 4 Drawing Sheets

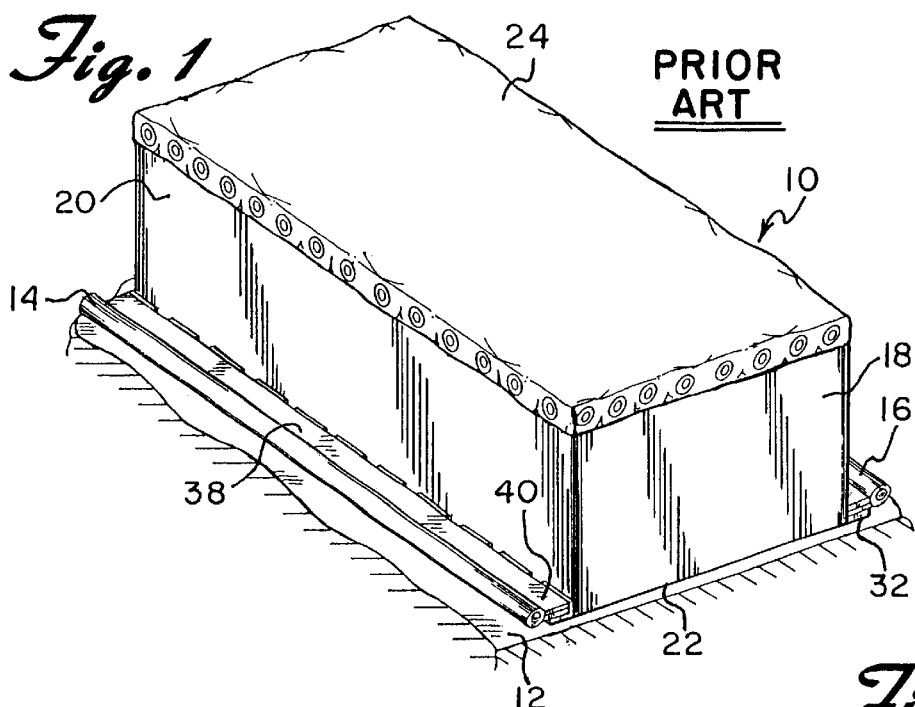
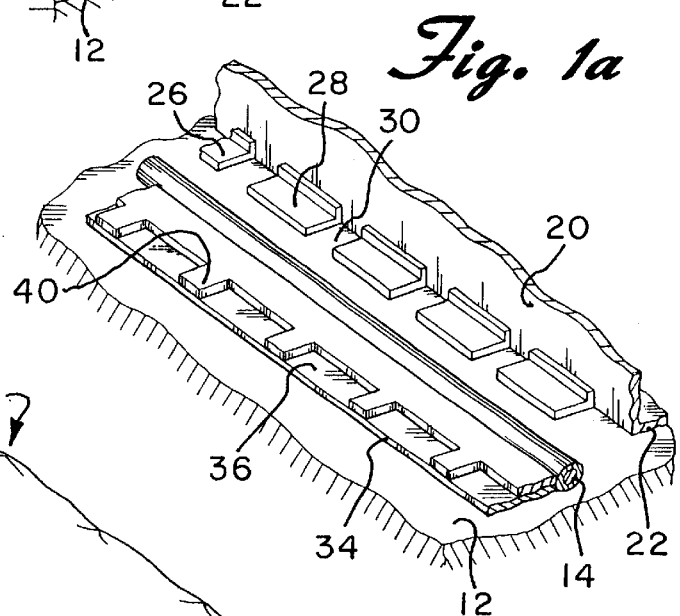
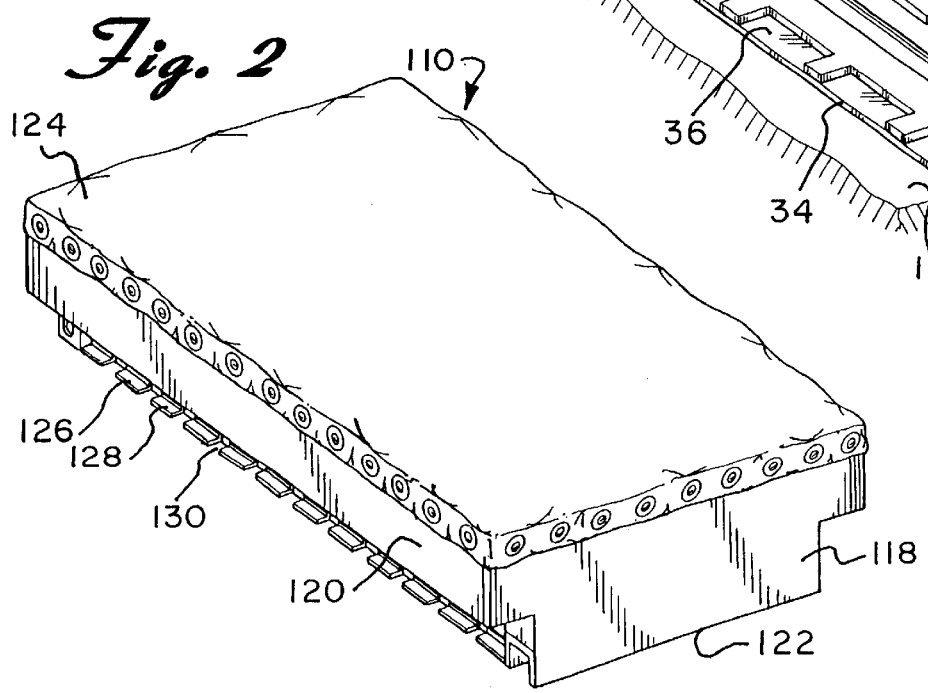

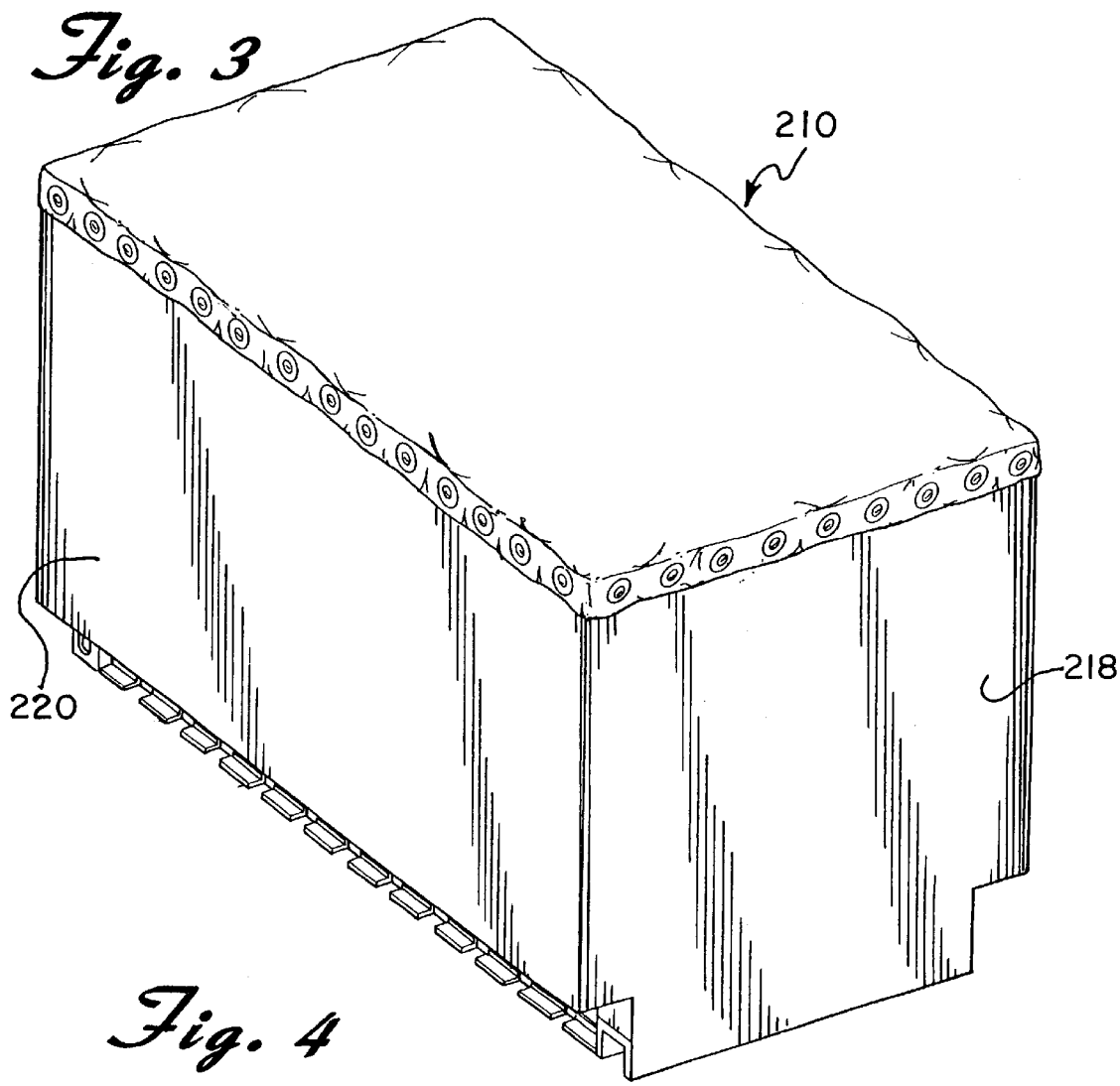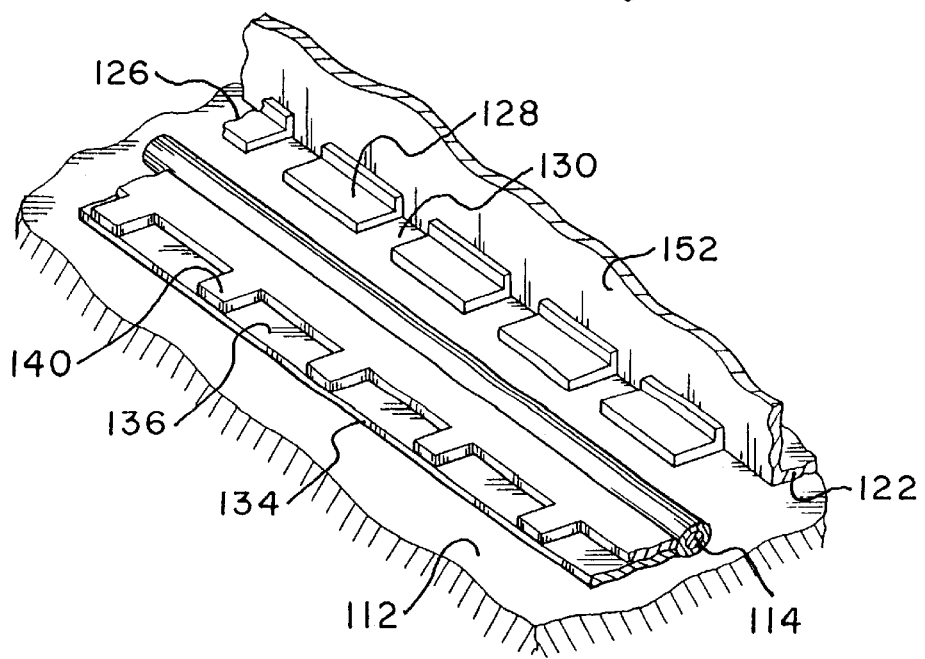

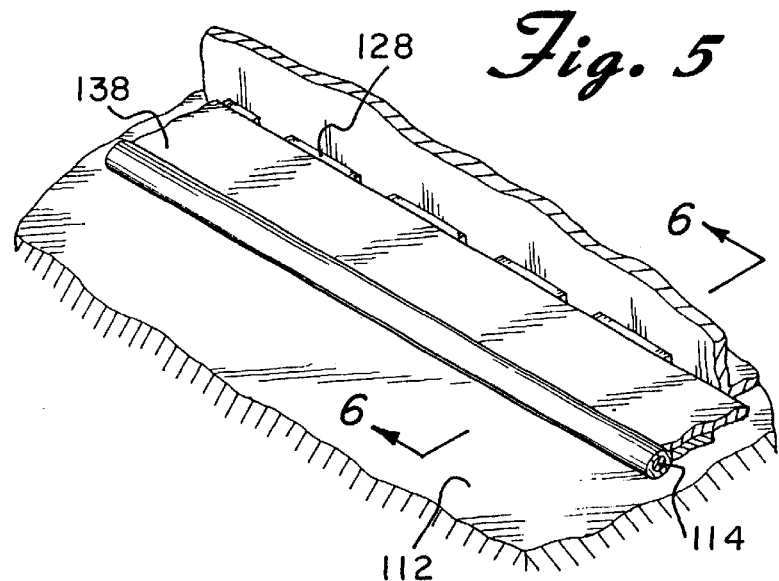
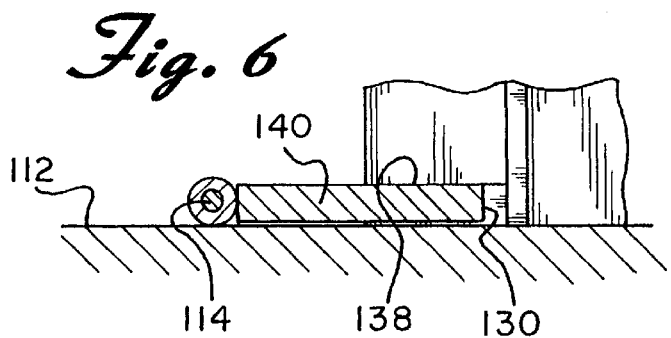
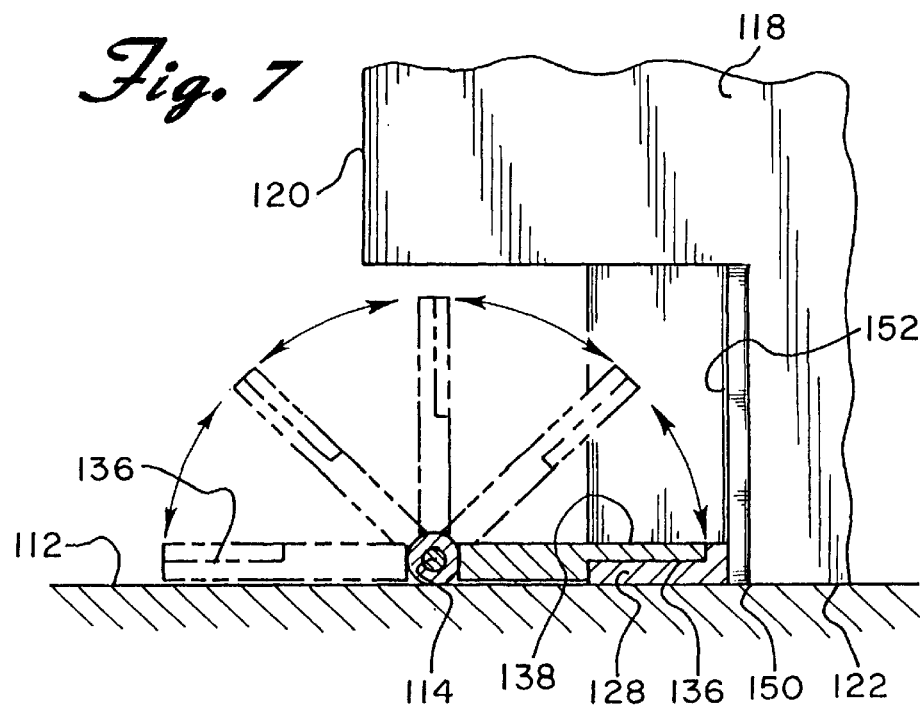

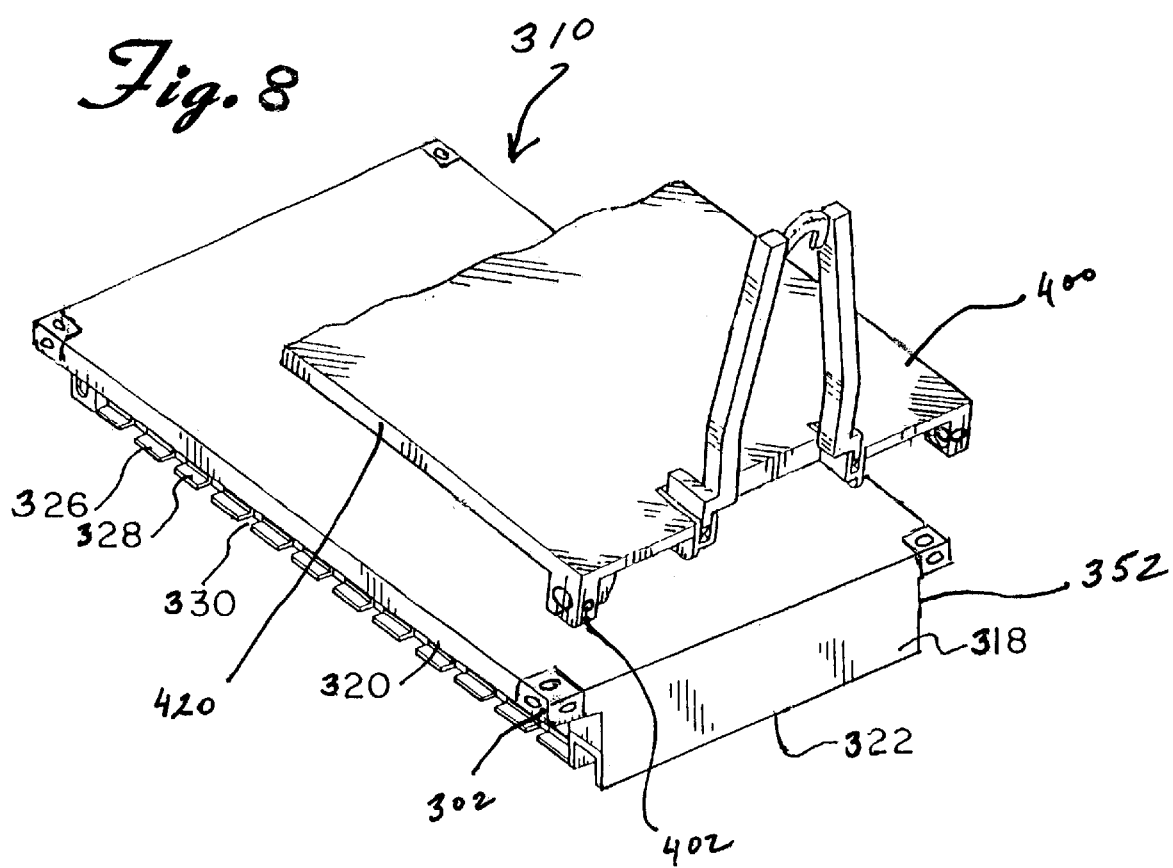

SHIPPING PLATFORM LOCKDOWN

CROSS-REFERENCE TO RELATED APPLICATION

This application is a Continuation-In-Part of prior U.S. application Ser. No. 09/277,105 filed Mar. 21, 1999, now U.S. Pat. No. 6,315,141.

BACKGROUND OF THE INVENTION

The present invention is directed toward a shipping box or platform lockdown arrangement and more particularly toward an improved shipping box which can be utilized with a conventional lockdown device but which increases shipping capacity.

It is well known to ship large containers on cargo airplanes and particularly military airplanes. In order to prevent movement of the shipping boxes both laterally and vertically, lockdown devices are provided on such planes which interfit with a portion of the shipping box.

Conventional lockdown devices for military cargo transport are comprised of a pair of elongated hinged metal plates secured to the floor of the aircraft. The hinged plates are arranged parallel to each other but spaced apart a sufficient distance to allow the shipping box to be positioned between the two plates with the side walls of the box being essentially parallel to the plates. Extending outwardly from the bottom of the box and perpendicular to the side walls thereof are a pair of flat rails, each of which includes a plurality of spaced apart tabs and a plurality of openings between the tabs. After the shipping box is in place between the hinged locking members, the locking members are pivoted from their inoperative position wherein they lie away from the rails to their operative position where they over lie the rails. Each locking member includes a substantially continuous plate which lies over the tabs to hold the shipping box down and a plurality of projections that extend into the openings between the tabs to prevent lateral movement of the shipping box. A lock can then be applied to the locking members to prevent them from being pivoted into their inoperative position until the same is desired.

The locking members are permanently secured to the floor of the aircraft and cannot be moved closer to or further away from each other. Thus, heretofore, only standard and uniform shipping boxes could be employed. That is, the width of the shipping box was limited by the fact that the lockdown rails extending outwardly from the bottom of the side walls thereof had to fit precisely between the elongated spaced apart hinged locking members so that they could properly engage the rails. A wider shipping box, therefore, could not be employed since the hold down rails on the box would then not properly interact with the locking members. This has somewhat limited the size of shipping boxes that could be carried on cargo aircraft.

SUMMARY OF THE INVENTION

The present invention is designed to overcome the deficiencies of the prior art described above. The shipping box or platform of the invention is constructed in a manner very similar to conventional shipping boxes. However, in order to increase the size of the box or carrying capacity, the side walls extend outwardly beyond the width of the box. The lockdown rails are thus recessed beneath the side walls of the box or platform. The distance between the side rails, however, remains the same as a conventional shipping box so that the same can be properly positioned between a pair of locking members on a cargo aircraft.

BRIEF DESCRIPTION OF THE DRAWINGS

For the purpose of illustrating the invention, there are shown in the accompanying drawings forms which are presently preferred; it being understood that the invention is not intended to be limited to the precise arrangements and instrumentalities shown.

FIG. 1 is a perspective view of a conventional shipping box constructed in accordance with the prior art and showing the same mounted on the floor of an aircraft;

FIG. 1a is a perspective view of a portion of the lockdown mechanism of FIG. 1;

FIG. 2 is a perspective view of one form of a shipping box constructed in accordance with the principles of the present invention;

FIG. 3 is a perspective view similar to FIG. 2 showing a second shipping box constructed in accordance with the present invention;

FIG. 4 is a perspective view showing the details of the lockdown mechanism of the present invention in the open or inoperative form;

FIG. 5 is a perspective view similar to FIG. 4 but showing the lockdown mechanism in the operative condition;

FIG. 6 is a cross-sectional view taken through the line 6—6 of FIG. 5;

FIG. 7 is a view similar to FIG. 6 but illustrating the operation of the lockdown mechanism as used with the present invention, and FIG. 8 is a partial perspective view of a third embodiment of the invention illustrating a shipping platform used to support a pallet.

DETAILED DESCRIPTION OF THE PREFERRED EMBODIMENTS

Referring now to the drawings in details wherein like reference numerals have been used throughout the various figures to designate like elements, there is shown in FIGS. 1 and 1a a conventional shipping box and lockdown assembly constructed in accordance with the prior art and designated generally as 10. The prior art shipping box 10 is shown secured to the floor 12 of an aircraft through the use of a pair of elongated spaced apart hinged locking members 14 and 16. The shipping box 10 is a conventional box having a pair of end walls such as wall 18 (the opposite end wall not being shown) and a pair of side walls such as wall 20 (the opposite side wall not being shown). The shipping box 10 also has a substantially flat bottom 22 and a top 24. The top 24 could, of course, be a fabric top such as shown in FIG. 1 or a solid top with a hinged opening. Alternatively, any one of the end or side walls could have doors or other openings therein for accessing the interior of the shipping box 10.

As shown most clearly in FIG. 1a, extending outwardly from the side wall 20 is a flat rail 26 which is comprised essentially of a plurality of spaced apart tabs 28 and a plurality of openings 30 between the tabs. The rail 26 lies in substantially the same plane as the bottom 22 of the shipping box 10 so as to rest on the floor 12 of the aircraft. Although the details of the same are not specifically shown, it should be readily apparent that a similar lockdown rail 32 is arranged on the opposite side wall (not shown) of the shipping box 10. The pair of flat lockdown rails 26 and 32 are essentially perpendicular to their respective side walls.

The elongated locking members 14 and 16 are constructed in essentially the same manner. Accordingly, while only the details of the lockdown member 14 are shown in FIG. 1a, it should be readily apparent that the lockdown member 16 is constructed in essentially the same manner. The lockdown member 14 is constructed essentially of an elongated substantially continuous plate 34 having an operative face 36 and an inoperative face 38. The operative face 36 includes a plurality of spaced apart projections 40 which extend upwardly from the surface 36. Each of the locking members 14 and 16 is secured to the floor 12 of the aircraft so as to be immovable relative to each other. That is, the positions of the lockdown members 14 and 16 cannot be moved relative to each other.

As should be readily apparent to those skilled in the art, the locking members 14 and 16 are first pivoted so as to be in the inoperative position as shown in FIG. 1a. Thereafter, the shipping box 20 is placed between the locking members 14 and 16. The plate 34 is then pivoted into its operative position wherein the projections 40 fit into the spaces 30 and the operative surfaces 36 overlie the tabs 28. The locking members 14 and 16 can then be locked into this operative position utilizing a conventional hasp and lock such as shown, for example, at 40. It should be readily apparent that, in the locking position shown in FIG. 1, the shipping box is incapable of moving in any direction.

The improved shipping box lockdown system of the present invention is shown in FIGS. 2–7. Since many of the component parts of the invention correspond essentially identically to the same parts shown in the prior art shipping box of FIGS. 1 and 1a, similar reference numerals have been used to designate the same elements but are proceeded by a "1" thereby creating a "one hundred series" of reference numerals. That is, the shipping box of the present invention shown in FIG. 2 is designated generally as 110. A slightly modified form of the shipping box 110 is shown in FIG. 3 and is indicated generally as 210. And a third embodiment of the invention in the form of a platform 310 is shown in FIG. 8.

The shipping box 110 includes a pair of end walls, only one of which is shown at 118 and a pair of side walls such as shown at 120. Again, the opposite side wall is not shown in the drawings. The shipping box 110 also includes a bottom wall 122 and a cover 124.

The shipping box 210 shown in FIG. 3 is essentially the same as the shipping box 110 shown in FIG. 2 and also includes end walls such as shown at 218 and side walls such as shown at 220. FIG. 3 is intended to merely illustrate that the height of the shipping box of the present invention is not relevant and essentially has no effect on the inventive concept. Furthermore, it should be readily understood that although the term shipping box is utilized throughout this application, it is within the scope of the invention to also apply the same to a relatively flat platform or pallet or the like 310 (FIG. 8) upon which goods may be placed. Thus, as used throughout this application, the term shipping box does not necessarily require that there be structural side or end walls.

As is illustrated in FIG. 8, the platform 310 can also be used to support a container roll in/out platform 400 (commonly referred to as a CROP) frequently used for transporting heavy equipment and supplies. The CROP 400 is shown, for example, in U.S. Pat. No. 5,799,585. Accordingly, the details of the same will not be described. However, the CROP 400 may be fitted with corner castings or the like 402 for connection with similar corner castings 302 located on the platform 310. The corner castings are by way of example only as any known means may be provided for connecting the CROP to the top of the platform 310.

Alternatively, it may be possible to provide a platform comprised of only the lower portion of the platform 310 of FIG. 8 bounded by the end walls 318 and the smaller vertical wall portions 352 from which the rails 326 extend. That is, the uppermost section of the platform 310 with the side walls 320 would be eliminated. The smaller platform would then be smaller in width than the CROP 400 and would attach under the CROP in any known manner. The combination of the smaller platform with the CROP attached to the top could then be considered to be a shipping box or platform in accordance with the invention, the side walls 420 of the CROP 400 being equivalent to the side walls 320 of the platform 310.

The differences between the inventive shipping box and the prior art shipping box should be readily apparent to one of ordinary skill in the art by comparing, for example, FIGS. 2 and 3 to FIG. 1. The inventive shipping box 110 includes essentially all of the features of the prior art. However, the width of the bottom 122 is smaller than the overall width of the box itself between the side walls. In other words, the side walls such as wall 120 extend over the extreme edges 150 (see FIG. 7) of the bottom wall 122. Although only one edge 150 of the bottom wall 122 is shown in FIG. 7, it should be readily apparent that the opposite side of the box 110 is constructed in substantially the same manner.

As shown most clearly in FIG. 7, the side wall 120 of the shipping box 110 does not extend completely down to the level of the bottom wall 122. Rather, it stops at a distance above the bottom wall 122 which distance must be greater than the width of the pivoting plate that forms the locking member 114. This creates a smaller lower vertical side wall portion 152 from which the rails such as rail 126 extends. Rail 126 includes the plurality of tabs 128 and the plurality of spaces 130 which are constructed in essentially the same manner as the prior art described above. However, rather than extending from the outermost side wall 120, the rails such as rail 126 extends from the wall 152 but remains substantially in the same plane as the bottom wall 122.

The distance between the pair of flat rails such as rail 126 and the corresponding rail on the opposite side of the shipping box 110 is essentially the same as the distance between the rails 26 and 32 of the prior art described above. Thus, the shipping box 110 can be placed on the floor 112 of a cargo plane between a pair of spaced apart hinged locking members in essentially the same manner as the shipping box 10. However, since the side wall such as wall 120 of the shipping box 110 extends over the lock down rails, the internal volume of the shipping box 110 or the shipping box 210 can be made substantially larger than the internal volume of the shipping box 10 of the prior art. Similarly, the upper surface of the platform 310 is larger than previous platforms and can, therefore, support more cargo.

While it may appear that some amount of storage space is eliminated because of the recesses at the bottom edges of the shipping boxes 110 and 220, those skilled in the art will recognize that no space is actually lost. Normally, the lowermost portion of most shipping boxes includes structural support beams and the like to provide structural rigidity to the box and allow the same to be moved. That is, even the lowermost portion of the shipping box 10 of FIG. 1 would have structural support beams or the like below and inner floor of the box. Thus, no storage space is sacrificed utilizing the present invention and, in fact, substantial space is added.

The present invention may be embodied in other specific forms without departing from the spirit or essential attributes thereof and accordingly reference should be made to the appended claims rather than to the foregoing specification as indicating the scope of the invention.

I claim:

1. In a shipping platform adapted to be locked down to the floor of an aircraft wherein said floor includes a pair of elongated spaced apart hinged locking members, each of said locking members including a substantially continuous plate having an inoperative face and an operative face and a plurality of spaced apart projections extending from said operative face, said shipping platform having a pair of side walls and a bottom and a pair of flat rails lying in substantially the same plane as said bottom and extending outwardly from said bottom and perpendicular to said side walls, each of said rails being comprised of a plurality of spaced apart tabs and a plurality of openings between said tabs, said shipping platform being adapted to be positioned between said pair of elongated spaced apart locking members so that said locking members can be pivoted to position their operative faces over said tabs with said projections fitting within said openings, the improvement wherein said platform has a pair of vertical walls parallel to said side walls, the distance between said side walls and said vertical walls being greater than the width of said plate, and said rails being recessed inwardly and extending from said vertical walls so that said rails do not extend beyond said side walls.

2. The improvement as claimed in claim 1 wherein said side walls do not extend downwardly to the level of said bottom.

3. The improvement as claimed in claim 2 further including a space above each of said rails to allow a locking member to pivot therethrough so as to engage its respective rail.

* * * * *